United States Patent
Ueda

(10) Patent No.: US 9,933,616 B2
(45) Date of Patent: Apr. 3, 2018

(54) MIRROR ANGULAR-POSITIONING APPARATUS AND PROCESSING APPARATUS

(75) Inventor: Shinji Ueda, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 541 days.

(21) Appl. No.: 13/152,901

(22) Filed: Jun. 3, 2011

(65) Prior Publication Data

US 2011/0297655 A1 Dec. 8, 2011

(30) Foreign Application Priority Data

Jun. 3, 2010 (JP) ................................. 2010-128269

(51) Int. Cl.
*B23K 26/00* (2014.01)
*G02B 26/10* (2006.01)
*G02B 26/12* (2006.01)

(52) U.S. Cl.
CPC ......... *G02B 26/105* (2013.01); *G02B 26/121* (2013.01)

(58) Field of Classification Search
CPC ............ B23K 26/1476; B23K 26/0656; B23K 26/02; B23K 26/0884
USPC ............ 219/121.67, 121.73, 121.74, 121.78, 219/121.79, 121.83, 121.6, 121.61; 318/9, 14, 400.32, 400.34
See application file for complete search history.

(56) References Cited

U.S. PATENT DOCUMENTS

| | | | | |
|---|---|---|---|---|
| 3,241,015 A | * | 3/1966 | Allen | 318/615 |
| 3,729,668 A | * | 4/1973 | Brette | 318/561 |
| 4,473,786 A | * | 9/1984 | Miyashita et al. | 318/561 |
| 4,558,265 A | * | 12/1985 | Hayashida et al. | 318/561 |
| 4,621,256 A | * | 11/1986 | Rusk | 341/3 |
| 4,908,510 A | * | 3/1990 | Huggins et al. | 250/231.13 |
| 4,928,009 A | * | 5/1990 | Ikebe et al. | 250/231.13 |
| 4,988,945 A | * | 1/1991 | Nagase | 324/175 |

(Continued)

FOREIGN PATENT DOCUMENTS

| CN | 1627121 A | 6/2005 |
|---|---|---|
| CN | 1750365 A | 3/2006 |

(Continued)

OTHER PUBLICATIONS

"Nanoscale Servo Control," Tokyo Denki University Press, pp. 174 to 178. This article is discussed in the specification. Note: copy to be provided at a later date.

(Continued)

*Primary Examiner* — David Angwin
*Assistant Examiner* — Jimmy Chou
(74) *Attorney, Agent, or Firm* — Rossi, Kimms & McDowell LLP

(57) ABSTRACT

An apparatus for angular positioning of a mirror includes a motor that rotates a mirror, a detector that detects a rotational angle of the mirror, and a controller. The controller supplies current to the motor so that the rotational angle of the mirror reaches a target angle, estimates, based on a model representing a relation between a value of current to be supplied to the motor and an angle of inclination of the mirror, the angle of inclination of the mirror to which current is supplied, and if the estimated angle exceeds a predetermined tolerance, adjusts the supply of current to the motor so that the angle of inclination of the mirror falls within the predetermined tolerance.

8 Claims, 11 Drawing Sheets

(56) References Cited

U.S. PATENT DOCUMENTS

| | | | |
|---|---|---|---|
| 5,138,564 A * | 8/1992 | de Jong et al. | 702/96 |
| 5,235,263 A * | 8/1993 | Boston et al. | 318/701 |
| 5,546,214 A * | 8/1996 | Black et al. | 359/203.1 |
| 5,653,900 A * | 8/1997 | Clement et al. | 219/121.68 |
| 5,747,797 A * | 5/1998 | Fujita | 250/231.14 |
| 5,898,495 A * | 4/1999 | Manning | 356/452 |
| 6,545,250 B2 | 4/2003 | Hartmann et al. | 219/121.83 |
| 6,639,207 B2 * | 10/2003 | Yamamoto et al. | 250/231.14 |
| 6,734,392 B2 * | 5/2004 | Philipp et al. | 219/121.82 |
| 6,817,528 B2 * | 11/2004 | Chen | 235/462.13 |
| 6,872,913 B1 * | 3/2005 | Jendick | B23K 26/0846 219/121.6 |
| 7,297,972 B2 * | 11/2007 | Bruland | 250/559.3 |
| 7,330,326 B2 * | 2/2008 | Hanks | 360/73.03 |
| 7,421,900 B2 * | 9/2008 | Karasawa et al. | 73/621 |
| 7,619,209 B2 * | 11/2009 | Wong et al. | 250/231.18 |
| 7,723,639 B2 * | 5/2010 | Ellin et al. | 219/121.61 |
| 7,875,844 B2 * | 1/2011 | Sheu et al. | 250/231.16 |
| 7,964,819 B2 * | 6/2011 | Bruland | 219/121.62 |
| 8,357,891 B2 | 1/2013 | Nishida et al. | 250/231.14 |
| 2001/0023862 A1 | 9/2001 | Hartmann et al. | 219/121.83 |
| 2002/0198622 A1* | 12/2002 | Dinauer et al. | 700/166 |
| 2003/0218126 A1* | 11/2003 | Shiba | 250/231.13 |
| 2004/0069751 A1* | 4/2004 | Yamazaki et al. | 219/121.6 |
| 2006/0000816 A1* | 1/2006 | Hogan | 219/121.75 |
| 2006/0196860 A1* | 9/2006 | Verschueren | 219/121.73 |
| 2008/0193726 A1* | 8/2008 | Shimada | G01C 19/5607 428/195.1 |
| 2008/0268619 A1* | 10/2008 | Nakamura | 438/463 |
| 2008/0293220 A1* | 11/2008 | Nakamura | 438/463 |
| 2009/0050611 A1* | 2/2009 | Sukhman | B41J 2/471 219/121.79 |
| 2009/0142906 A1* | 6/2009 | Nakamura | 438/463 |
| 2009/0149002 A1* | 6/2009 | Watanabe et al. | 438/463 |
| 2009/0166812 A1* | 7/2009 | Ruuttu | C23C 14/20 257/629 |
| 2009/0197395 A1* | 8/2009 | Nakamura et al. | 438/463 |
| 2009/0215245 A1* | 8/2009 | Nakamura | 438/463 |
| 2009/0242522 A1* | 10/2009 | Baird et al. | 219/121.61 |
| 2009/0289042 A1* | 11/2009 | Ueda | 219/121.72 |
| 2009/0298263 A1* | 12/2009 | Watanabe et al. | 438/463 |
| 2009/0298264 A1* | 12/2009 | Arai et al. | 438/464 |
| 2009/0309532 A1* | 12/2009 | Ueda | 318/600 |
| 2010/0051792 A1* | 3/2010 | Sheu et al. | 250/231.13 |
| 2011/0210103 A1* | 9/2011 | Bruland et al. | 219/121.67 |
| 2011/0260716 A1* | 10/2011 | Robinson et al. | 324/207.22 |

FOREIGN PATENT DOCUMENTS

| | | |
|---|---|---|
| CN | 101587241 A | 11/2009 |
| EP | 2 124 086 A2 | 11/2009 |
| JP | 61-116632 A | 6/1986 |
| JP | 2004-017101 A | 1/2004 |
| KR | 2009-0122135 A | 11/2009 |
| WO | 02/080081 A1 | 10/2002 |

OTHER PUBLICATIONS

Korean Office Action for corresponding KR 10-2011-0053215, dated Jul. 12, 2013.
Extended European Search Report issued in Counterpart Application No. 11167393 dated Apr. 2, 2014.
Notification of the First Office Action issued in counterpart Application No. 201110148747.8 dated Aug. 30, 2013.

* cited by examiner

ANGLE OF MIRROR
15 [urad / div]

CURRENT [A]

FACE TANGLE ERROR ANGLE [urad]

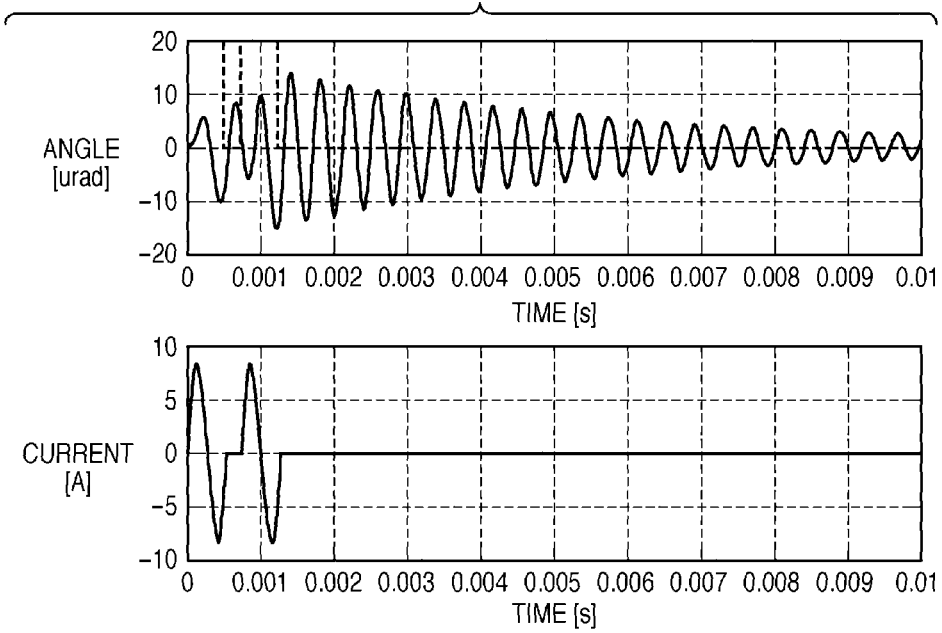
F I G. 6A
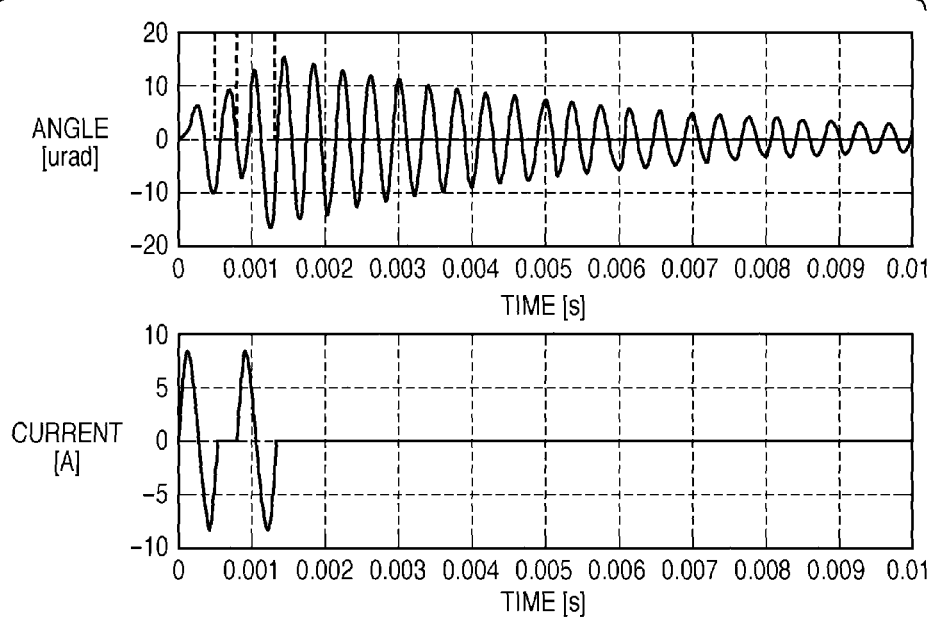
F I G. 6B

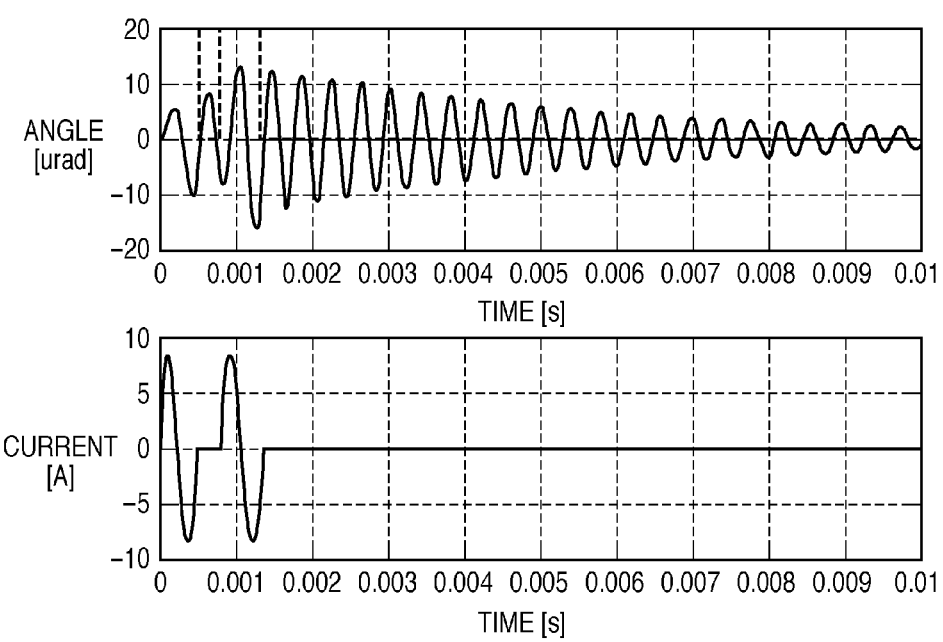
F I G. 7A
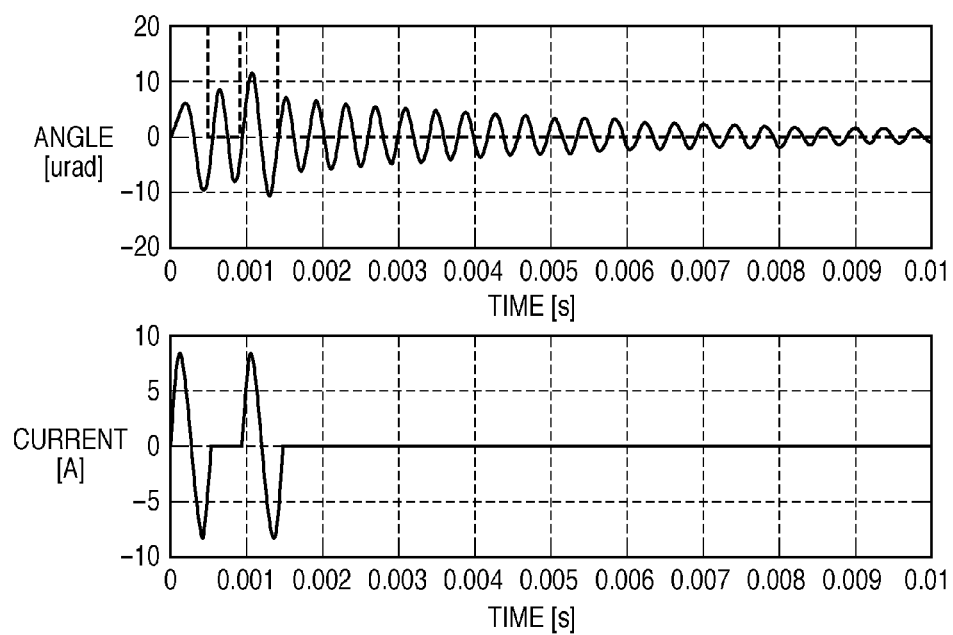
F I G. 7B

MIRROR ANGULAR-POSITIONING APPARATUS AND PROCESSING APPARATUS

BACKGROUND OF THE INVENTION

Field of the Invention

The present invention relates to a mirror angular-positioning apparatus and a processing apparatus.

Description of the Related Art

A galvano apparatus is used in laser processing apparatuses (machine tools) such as a laser drilling machine, laser trimmer, and laser repairer. The galvano apparatus irradiates a target position with laser light by reflecting it by a mirror attached to the rotating shaft of a motor while controlling the rotational angle of the mirror. To accurately align the laser light irradiation position with the target position, it is necessary to accurately control the rotational angle of the mirror. Therefore, the galvano apparatus includes a detector (for example, a capacitive sensor or an optical or magnetic encoder) for detecting the rotational angle of the mirror. Note that the mirror of the galvano apparatus must be rotated at a high speed because the laser processing apparatus is required to have a high operating speed as well.

Also, in the galvano apparatus, if no dynamic balance is obtained between the motor rotating shaft and mirror or if a force generated by a magnet and coil of the motor contains a component in a direction other than the rotational direction, a vibration mode in which the mirror vibrates in a direction in which the mirror falls toward the motor rotating shaft is excited. To suppress this vibration of the mirror in the falling direction, Japanese Patent Laid-Open No. 61-116632 has proposed a technique of adjusting the dynamic balance to the motor rotating shaft.

In this prior art, however, it is impossible to sufficiently remove the vibration of the mirror in the falling direction when rapidly and accurately positioning the laser irradiation position (that is, the mirror rotational angle). In addition, the detector for detecting the mirror rotational angle in the conventional galvano apparatus cannot detect the vibration of the mirror in the falling direction. Accordingly, an article may be processed with this vibration existing, so a processing error may occur in the article. Especially when continuously positioning a laser in a plurality of irradiation positions, a positioning operation succeeding another positioning operation may be performed before the vibration of the mirror in the falling direction sufficiently attenuates. As a consequence, the waves of the vibrations may superpose each other to generate a large vibration.

SUMMARY OF THE INVENTION

The present invention provides, for example, a technique advantageous in terms of reduction in an adverse effect of a mirror face tangle error.

According to one aspect of the present invention, there is provided an apparatus for angular positioning of a mirror. The apparatus includes a first mirror, a first motor configured to rotate the first mirror, a first detector configured to detect a rotational angle of the first mirror, a first controller configured to supply an electric current to the first motor so that the rotational angle of the first mirror reaches a target angle, to estimate, based on a model representing a relation between a value of the electric current to be supplied to the first motor and a face tangle error angle (i.e., an angle of inclination) of the first mirror, the face tangle error angle of the first mirror in a case where the electric current is supplied to the first motor, and to, if the estimated angle exceeds a tolerance, perform a process of adjusting of a supply of the electric current to the first motor so that the face tangle error angle of the first mirror falls within the tolerance.

Further aspects of the present invention will become apparent from the following description of exemplary embodiments with reference to the attached drawings.

BRIEF DESCRIPTION OF THE DRAWINGS

FIGS. 6A and 6B are views for explaining mirror positioning in a galvano apparatus according to the second embodiment.

FIGS. 7A and 7B are views for explaining mirror positioning in the galvano apparatus according to the second embodiment.

DESCRIPTION OF THE EMBODIMENTS

Figure 1:
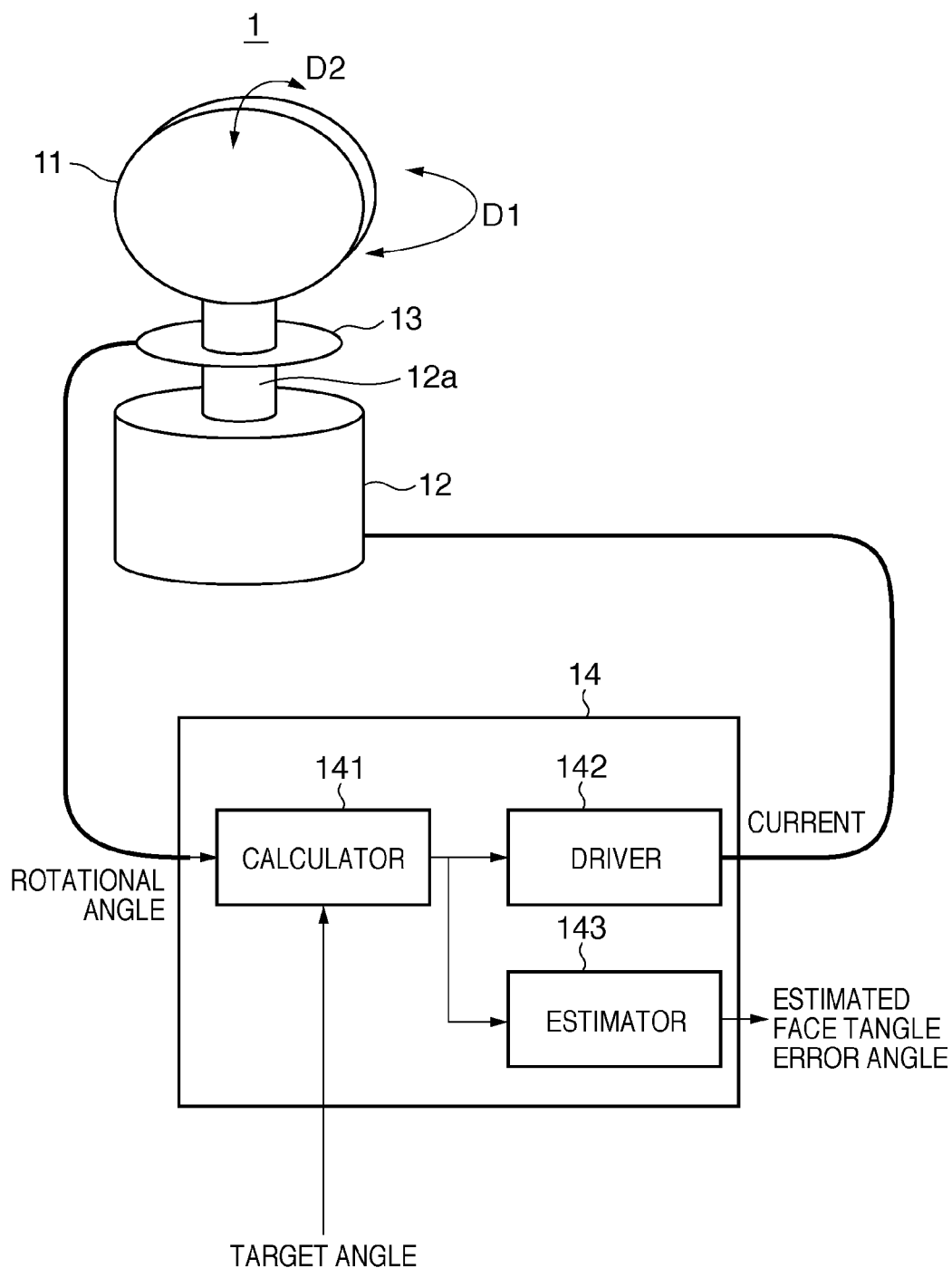
FIG. 1 is an exemplary view showing the arrangement of a galvano apparatus according to the first embodiment.

Preferred embodiments of the present invention will be described below with reference to the accompanying drawings. Note that the same reference numerals denote the same members throughout the drawings, and a repetitive description thereof will not be given.

First Embodiment

FIG. 1 is a schematic view showing the arrangement of a galvano apparatus 1 according to the first embodiment of the present invention. The galvano apparatus 1 is an apparatus that is applied to a laser processing apparatus such as a laser drilling machine, laser trimmer, or laser repairer, and irradiates a target position of an irradiation target (an article as a processing target) by reflecting laser light. The galvano apparatus 1 includes a mirror 11, motor 12, detector 13, and controller 14.

The mirror 11 is attached to a rotating shaft 12a of the motor 12, and reflects the laser light toward an irradiation target or another mirror. The motor 12 is a rotary motor for rotating the mirror 11. In this embodiment, the detector 13 is a rotary encoder attached to the rotating shaft 12a of the motor 12, and detects the rotational angle of the mirror 11 (that is, the rotational angle of the rotating shaft 12a). The controller 14 has a function of controlling the rotational angle of the mirror 11. For example, the controller 14 controls the motor 12 such that the rotational angle of the mirror 11 detected by the detector 13 matches a target angle.

The controller 14 will be explained in detail below. In this embodiment, the controller 14 includes a calculator 141, driver 142, and estimator 143.

The calculator 141 receives the rotational angle of the mirror 11 detected by the detector 13, and an angle as a target of the mirror 11, that is, the target angle of the mirror 11. The calculator 141 calculates the difference between the rotational angle and target angle of the mirror 11, and determines the value of an electric current to be supplied to the motor 12 such that the difference becomes zero (that is, the rotational angle of the mirror 11 matches the target angle). The current value determined by the calculator 141 is input to the driver 142 and estimator 143. In accordance with the current value determined by the calculator 141, the driver 142 supplies an electric current for driving the motor 12 to it. In accordance with the electric current supplied from the driver 142, the motor 12 rotates the mirror 11 in a rotational direction D1 and positions the mirror 11 at the target angle.

Figure 2A:
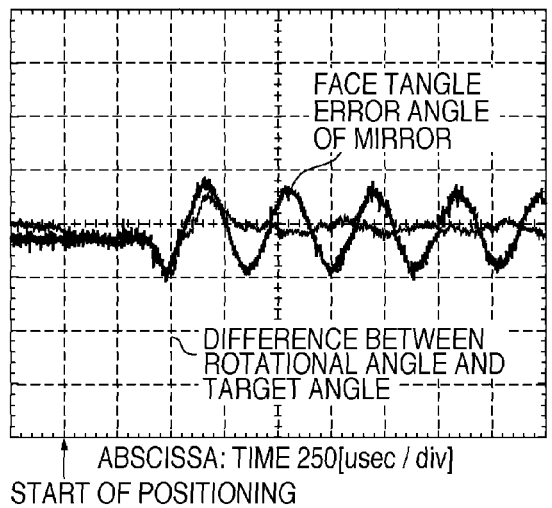
FIGS. 2A and 2B are views for explaining the vibration of a mirror in an axial falling direction in the galvano apparatus shown in FIG. 1.
Figure 2B:
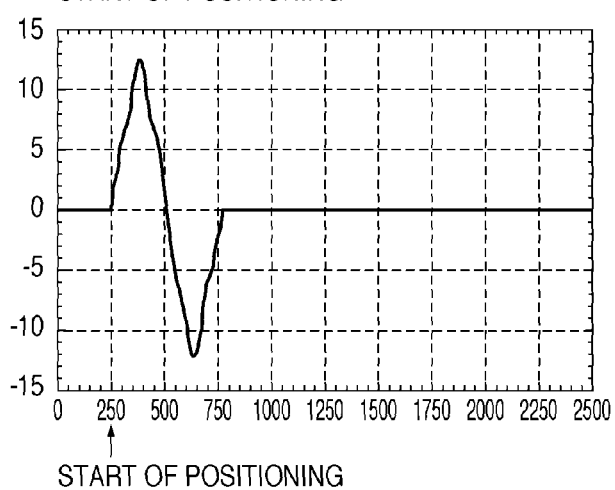

In this process, the mirror 11 tilts and vibrates in an axial falling direction D2. Note that the axial fall of the mirror 11 means that the mirror 11 inclines to a reference axis (a designed central axis of the rotating shaft 12a), and the angle the mirror 11 makes with the reference axis will be referred to as a face tangle error angle hereinafter. FIG. 2A is a view showing the relation between the difference between the target angle and the rotational angle of the mirror 11 when the mirror 11 is rotated to the target angle (the rotational angle of the mirror 11 detected by the detector 13), and the face tangle error angle (a measurement value) of the mirror 11. Note that the measurement of the face tangle error angle of the mirror 11 is started 400 μsec after the positioning of the mirror 11 is started, due to the limitations on a measurement system. FIG. 2B shows the waveform of an electric current supplied from the driver 142 to the motor 12 when the mirror 11 is rotated to the target angle as shown in FIG. 2A.

Referring to FIGS. 2A and 2B, a face tangle error angle θ [rad] of the mirror 11, which corresponds to the value [A] of the electric current supplied to the motor 12, can be approximated by a transfer function model of a single-degree-of-freedom damping system, as indicated by $$\theta = (1.061 \times 10^2)/(s^2 + 427.3s + 2.547 \times 10^8) \quad (1)$$

where s is a Laplace operator.

Figure 3:
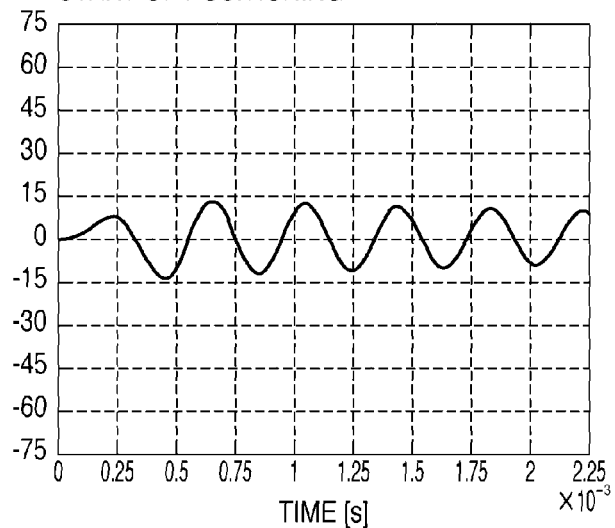
FIG. 3 is a view showing a result obtained when a face tangle error angle of a mirror is estimated by using a model indicated by equation 1.

FIG. 3 shows a result when the face tangle error angle of the mirror 11 is estimated using the model indicated by equation (1). Referring to FIG. 3, the face tangle error angle of the mirror 11 is plotted on the ordinate, and the time elapsed from the start of positioning of the mirror 11 is plotted on the abscissa. Comparing FIG. 2A with FIG. 3 shows that the measurement value of the face tangle error angle of the mirror 11 accurately matches the estimated value of the face tangle error angle of the mirror 11, which is obtained using the model indicated by equation (1).

The estimator 143 estimates the face tangle error angle of the mirror 11, which corresponds to the value of the electric current supplied to the motor 12 by the driver 142, by referring to the above-described model representing the relation between the value of the electric current supplied to the motor 12 and the face tangle error angle of the mirror 11. The face tangle error angle of the mirror 11 estimated by the estimator 143 is output as an estimated face tangle error angle, and provided to a processor or the like. Note that the processor determines whether the estimated face tangle error angle of the mirror 11 has exceeded a tolerance. If the processor determines that the estimated face tangle error angle of the mirror 11 has exceeded the tolerance, the processor performs a process of allowing the face tangle error angle of the mirror 11 to fall within the tolerance when rotating the mirror 11 to the target angle (a process of adjusting the supply of the electric current to the motor 12 by the driver 142).

Figure 4:
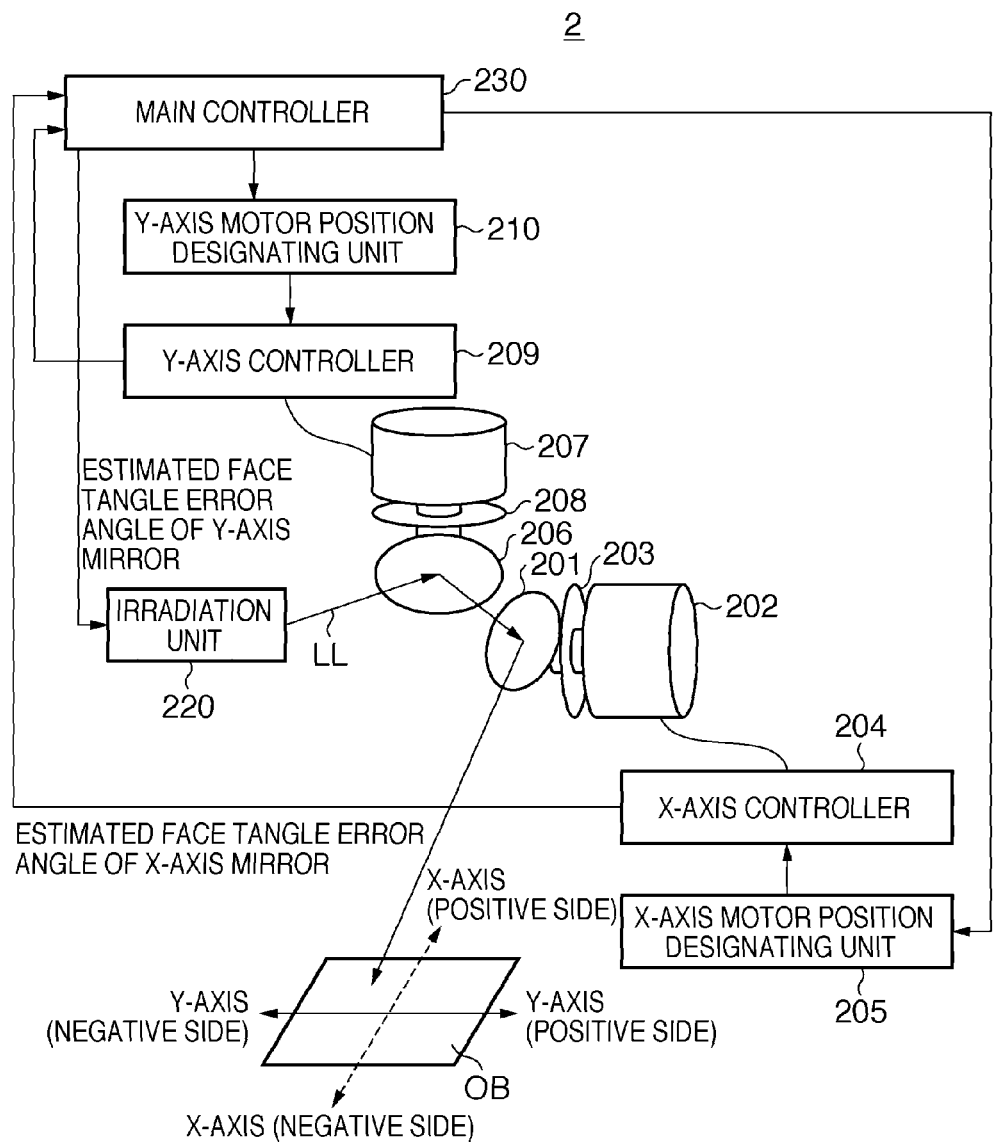
FIG. 4 is a schematic view showing the arrangement of a laser processing apparatus using the galvano apparatus shown in FIG. 1.

FIG. 4 is a schematic view showing the arrangement of a laser processing apparatus 2 using the galvano apparatus 1 shown in FIG. 1. The laser processing apparatus 2 includes an irradiation unit 220 for emitting laser light LL that irradiates an object OB as a processing target, a first unit for controlling the irradiation position of the laser light LL in the X-axis direction, a second unit for controlling the irradiation position of the laser light LL in the Y-axis direction, and a main controller 230. Note that the X- and Y-axes are perpendicular to each other.

The first unit includes an X-axis mirror (first mirror) 201, an X-axis motor (first motor) 202 for rotating the X-axis mirror 201, and an X-axis detector (first detector) 203 for detecting the rotational angle of the X-axis mirror 201. In addition, the first unit includes an X-axis controller 204 for controlling the X-axis motor 202, and an X-axis motor position designating unit 205 for controlling the irradiation position of the laser light LL in the X-axis direction by designating (inputting) the target angle of the X-axis mirror 201.

The second unit includes a Y-axis mirror (second mirror) 206, a Y-axis motor (second motor) 207 for rotating the Y-axis mirror 206, and a Y-axis detector (second detector) 208 for detecting the rotational angle of the Y-axis mirror 206. In addition, the second unit includes a Y-axis controller 209 for controlling the Y-axis motor 207, and a Y-axis motor position designating unit 210 for controlling the irradiation position of the laser light LL in the Y-axis direction by designating (inputting) the target angle of the Y-axis mirror 206.

The X-axis controller 204 has an arrangement equivalent to that of the controller 14 explained with reference to FIG. 1. The X-axis controller 204 estimates the face tangle error angle of the X-axis mirror 201 (a first estimator), and supplies an electric current for driving the X-axis motor 202 to it (a first driver). Likewise, the Y-axis controller 209 has an arrangement equivalent to that of the controller 14 explained with reference to FIG. 1. The Y-axis controller 209 estimates the face tangle error angle of the Y-axis mirror 206 (a second estimator), and supplies an electric current for driving the Y-axis motor 207 to it (a second driver). Note that the X-axis controller 204 provides the main controller 230 with an X-axis mirror estimated face tangle error angle indicating the estimated face tangle error angle of the X-axis mirror 201, and the Y-axis controller 209 provides the main controller 230 with a Y-axis mirror estimated face tangle error angle indicating the estimated face tangle error angle of the Y-axis mirror 206. Note also that the rotating shafts of the X-axis motor 202 and Y-axis motor 207 are perpendicular to each other.

When processing the object OB (that is, when irradiating the object OB with the laser light LL), the main controller 230 designates the coordinates of the laser light LL irradiation position on the object OB, to the X-axis motor position designating unit 205 and Y-axis motor position designating unit 210. The X-axis motor position designating unit 205 and Y-axis motor position designating unit 210 respectively convert the coordinates designated by the main controller 230 into the target angles of the X-axis mirror 201 and Y-axis mirror 206, and designate these target angles to the X-axis controller 204 and Y-axis controller 209.

Note that if the X-axis mirror estimated face tangle error angle provided by the X-axis controller 204 and the Y-axis mirror estimated face tangle error angle provided by the Y-axis controller 209 have exceeded a tolerance, the main controller 230 stops the emission of the laser light LL by the irradiation unit 220 until these angles fall within the tolerance. After the X-axis mirror estimated face tangle error angle and Y-axis mirror estimated face tangle error angle fall within the tolerance, the main controller 230 controls the irradiation unit 220, X-axis motor position designating unit 205, and Y-axis motor position designating unit 210, such that the emission of the laser light LL to the object OB is started or resumed.

In this embodiment as described above, if face tangle error angle (vibration) occurs when the X-axis mirror 201 and Y-axis mirror 206 are rotated to target angles, the emission of the laser light LL to the object OB (the processing of the object OB) is stopped until these mirror face tangle error angles fall within a tolerance. Accordingly, the laser processing apparatus 2 can accurately process the object OB by reducing processing errors of the object OB.

Second Embodiment

A laser processing apparatus instructs a galvano apparatus to position a mirror, and irradiates a processing position (irradiation position) on an object as a processing target with laser light. In this case, the processing position on the object as a processing target is predetermined, and the target angle of the mirror for irradiating the processing position with the laser light is also predetermined. Accordingly, when the timing at which the mirror of the galvano apparatus is positioned to the next target angle (the start time of positioning) is determined, the face tangle error angle of the mirror at that time can be estimated by using the model as explained in the first embodiment. In this embodiment, therefore, an adjusting time (waiting time) is inserted before the positioning of the mirror is started, so that the face tangle error angle of the mirror falls within a tolerance when processing an object as a processing target (when irradiating the object as a processing target with the laser light).

Figure 5:
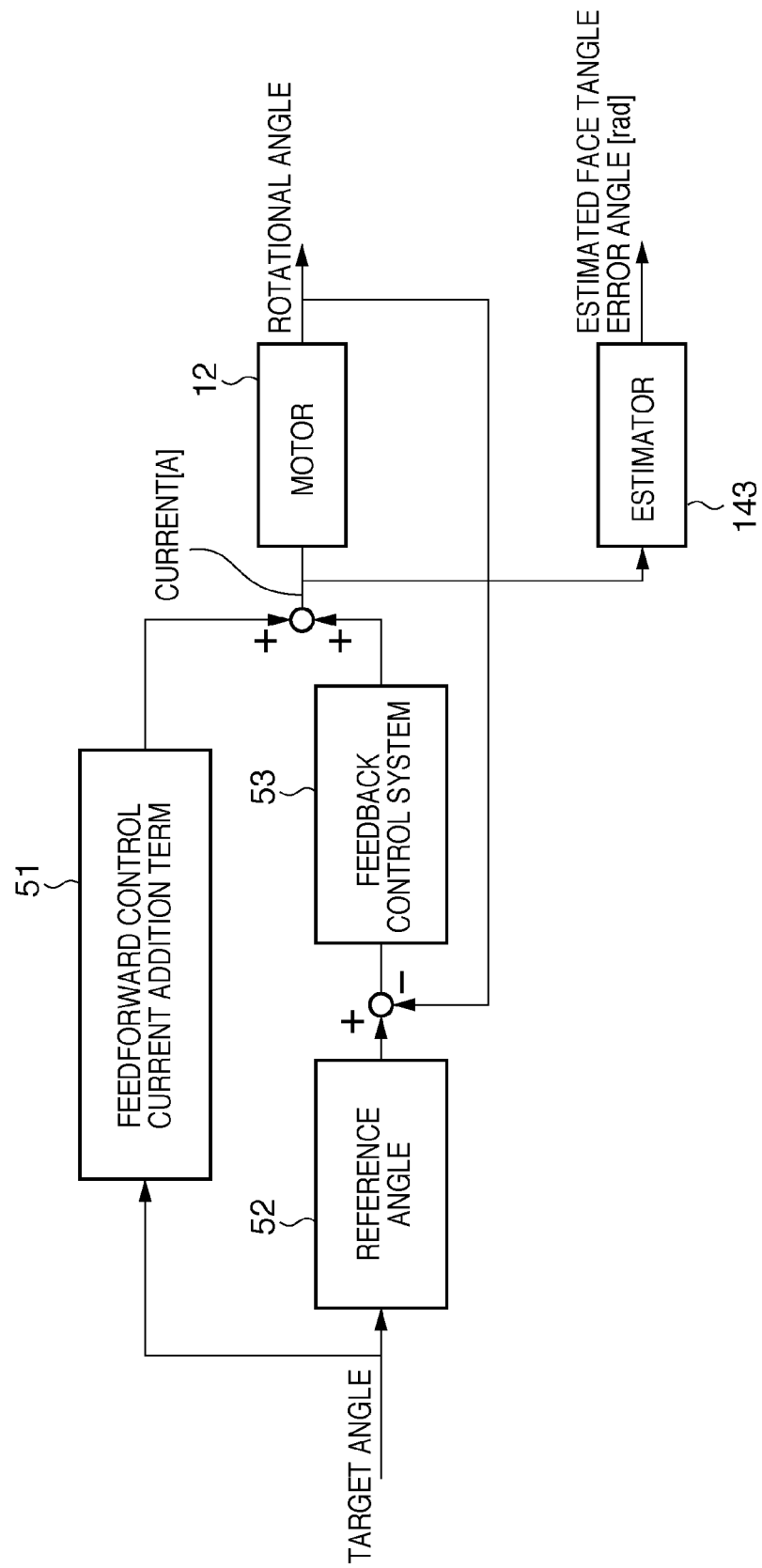
FIG. 5 is a schematic block diagram showing an example of the arrangement of a mirror positioning control system according to the second embodiment, which is applied to the galvano apparatus shown in FIG. 1.

FIG. 5 is a schematic block diagram showing an example of the arrangement of a positioning control system of a mirror 11 according to this embodiment, which is applied to a galvano apparatus 1 shown in FIG. 1. Note that in this embodiment, a motor 12 has a motor model by which the rotational angle of the mirror 11 detected by a detector 13 is approximated by a transfer function model of $1.736 \times 10^4/s^2$ with respect to the value of an electric current supplied from a driver 142. Note also that the mirror 11 and detector 13 are rigid parts that do not twist against a motion in a rotational direction D1.

As shown in FIG. 5, the positioning control system of the mirror 11 according to this embodiment is a two-degrees-of-freedom digital control system. Note that an estimator 143 estimates the face tangle error angle of the mirror 11 by using the model indicated by equation (1). In the two-degrees-of-freedom control system, a feedforward control current addition term 51 is designed by a jerk minimization track based on final-state control. Also, a reference angle 52 is set to a value obtained by calculating an angular response by inputting the feedforward control current addition term 51 to the motor model of the motor 12. Accordingly, a feedback control system 53 does not function when the rotational angle obtained from the motor model of the motor 12 matches the actual rotational angle of the motor 12 (that is, the rotational angle of the mirror 11 detected by the detector 13). Assume that in this embodiment, the rotational angle obtained from the motor model of the motor 12 matches the actual rotational angle of the motor 12.

Final-state control is explained in detail in, for example, "Nanoscale Servo Control" (Tokyo Denki University Press, pp. 174 to 178), and is control by which the initial state of a system is set in a final state designated by a finite time by giving an input to a control target. In this embodiment, the motor model of the motor 12 as a control target is converted from a transfer function model into a discrete-time system model, and the electric current to be supplied to the motor 12 is designed by a so-called jerk minimization track that minimizes the total sum of first-order differential of the acceleration of the motor 12.

In this embodiment as presented below, a case in which the mirror 11 was positioned twice in succession by the same rotational amount (angular moving amount), that is, $7 \times 10^{-3}$ [rad] will be explained in detail.
First Positioning
Angular position in initial state: x [0]=0 [rad]
Angular position in final state: x [N]=$7 \times 10^{-3}$ [rad]
Second Positioning
Angular position in initial state: x [0]=$7 \times 10^{-3}$ [rad]
Angular position in final state: x [N]=$14 \times 10^{-3}$ [rad]

A sampling frequency was 150 kHz, and a final step count was 79. Note that the final step count is the number of times of sampling when the mirror 11 is changed from the initial state to the final state.

In the first positioning and second positioning, the rotational amounts, rotational directions, and final step counts are the same, so the angular responses of the motor 12 to the value of the electric current supplied from the driver 142 are the same.

After the mirror 11 was set in the final state with respect to a command for performing the first positioning (the supply of the electric current to the driver 142), the adjusting time was set, and a command for performing the second positioning was issued. FIGS. 6A, 6B, 7A, and 7B show results when the face tangle error angle of the mirror 11 was estimated by changing the adjusting time set between the first positioning and second positioning by 66.4 [μsec] at a time. In the upper half of each of FIGS. 6A, 6B, 7A, and 7B, the face tangle error angle (an estimated value) of the mirror 11 is indicated by the solid line, and the rotational angle of the mirror 11 detected by the detector 13 is indicated by the broken lines. Also, the lower half of each of FIGS. 6A, 6B, 7A, and 7B shows the waveform of the electric current supplied from the driver 142 to the motor 12.

Assume that after the positioning of the mirror of the galvano apparatus is complete, the time required for the laser processing apparatus to irradiate an object with laser light is 200 [μsec]. Assume also that in order to satisfy the processing accuracy of the object, the difference between the rotational angle and target angle of the mirror and the face tangle error angle of the mirror must be 10 [μrad] or less.

As shown in each of FIGS. 6A, 6B, and 7A, when the adjusting time is $199.2 \times 10^{-6}$ [sec], $265.6 \times 10^{-6}$ [sec], or $332.0 \times 10^{-6}$ [sec], the face tangle error angle of the mirror is 10 [μrad] or more. Also, referring to FIG. 7A, when the adjusting time is 332.0×10$^{-6}$ [sec], 2.7 [msec] are necessary to reduce the face tangle error angle of the mirror to 10 [μrad] or less.

On the other hand, as shown in FIG. 7B, when the adjusting time is 398.4×10$^{-6}$ [sec], the face tangle error angle of the mirror is 10 [μrad] or less when the second positioning is complete, and the laser light irradiation conditions are met 1.5 [msec] after that.

In this embodiment as described above, when rotating the mirror of the galvano apparatus to the next target angle after the face tangle error angle of the mirror falls within the tolerance, the timing at which the driver supplies an electric current to the motor is controlled. More specifically, before the time at which the electric current for rotating the mirror of the galvano apparatus to the next target angle is supplied to the motor, the adjusting time for allowing the face tangle error angle of the mirror to fall within the tolerance is set. This makes it possible to suppress the face tangle error angle (or vibration) of the mirror, and rapidly and accurately process an object as a processing target.

In this embodiment, the case in which the mirror is positioned twice in succession by the same rotational amount (angular moving amount) is explained. However, even when the mirror is positioned by different rotational amounts or positioned three times or more in succession, it is similarly possible to rapidly and accurately process an object as a processing target by setting the adjusting time for allowing the face tangle error angle of the mirror to fall within the tolerance.

Also, in this embodiment, the mirror positioning control system is constructed by a two-degrees-of-freedom control system using the final state. However, the mirror positioning control system may also be constructed by a single-degree-of-freedom control system or another two-degrees-of-freedom control system.

Furthermore, if the emission of the laser light is strictly controllable, the laser light is emitted only when the mirror face tangle error angle falls within the tolerance. This makes it possible to more accurately process an object as a processing target.

Third Embodiment

As described above, when the timing at which a mirror of a galvano apparatus is positioned to the next target angle (the start time of positioning) is determined, the face tangle error angle of the mirror at that time can be estimated by using the model as explained in the first embodiment. In this embodiment, therefore, the time required for mirror positioning is adjusted (prolonged) so that the face tangle error angle of the mirror falls within a tolerance when processing an object as a processing target (when irradiating the object as a processing target with laser light).

In this embodiment as presented below, a case in which a mirror 11 was positioned twice in succession by the same rotational amount (angular moving amount), that is, 7×10$^{-3}$ [rad] will be explained in detail. Note that the arrangement of a positioning control system of the mirror 11 is the same as that of the second embodiment.

First Positioning
Angular position in initial state: x [0]=0 [rad]
Angular position in final state: x [N]=7×10$^{-3}$ [rad]
Sampling frequency: 150 kHz
Final step count: 79
Second Positioning
Angular position in initial state: x [0]=7×10$^{-3}$ [rad]
Angular position in final state: x [N]=14×10$^{-3}$ [rad]
Sampling frequency: 150 kHz
Final step count: 79, 90, 105

In the first positioning and second positioning, the rotational amounts and rotational directions are the same, but the final step counts are different. Therefore, the angular responses of a motor 12 to the value of an electric current supplied from a driver 142 are different.

Figure 8A:
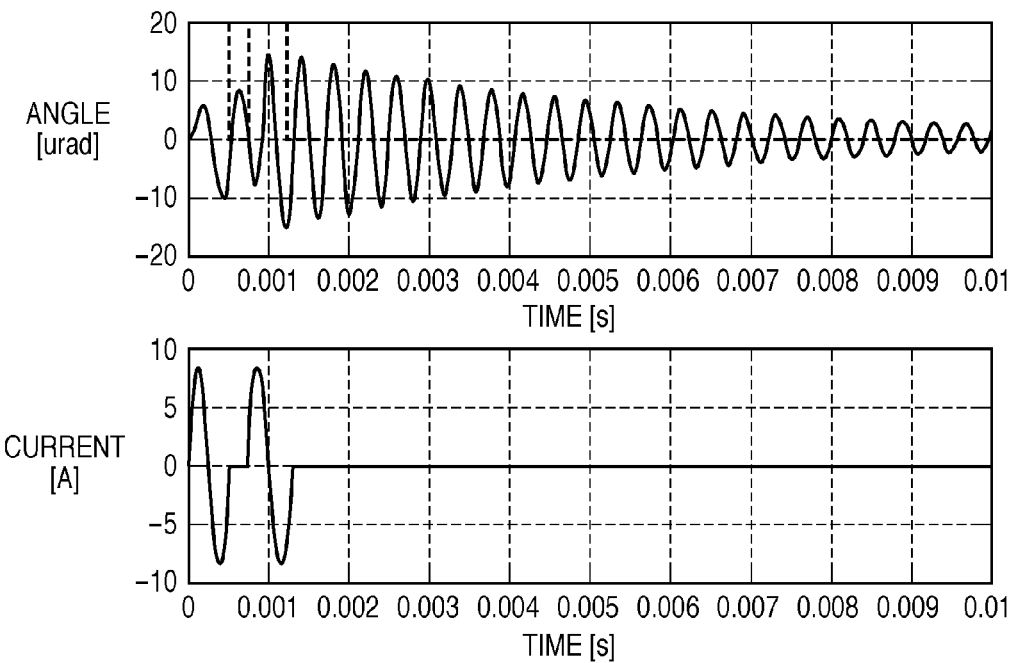
FIGS. 8A and 8B are views for explaining mirror positioning in a galvano apparatus according to the third embodiment.
Figure 8B:
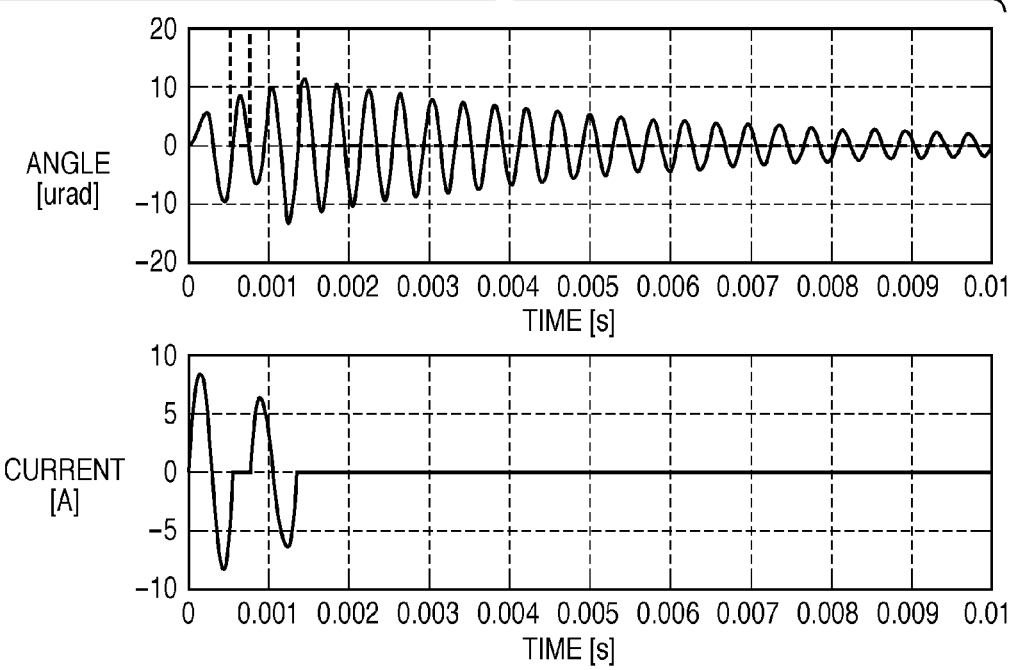
Figure 9:
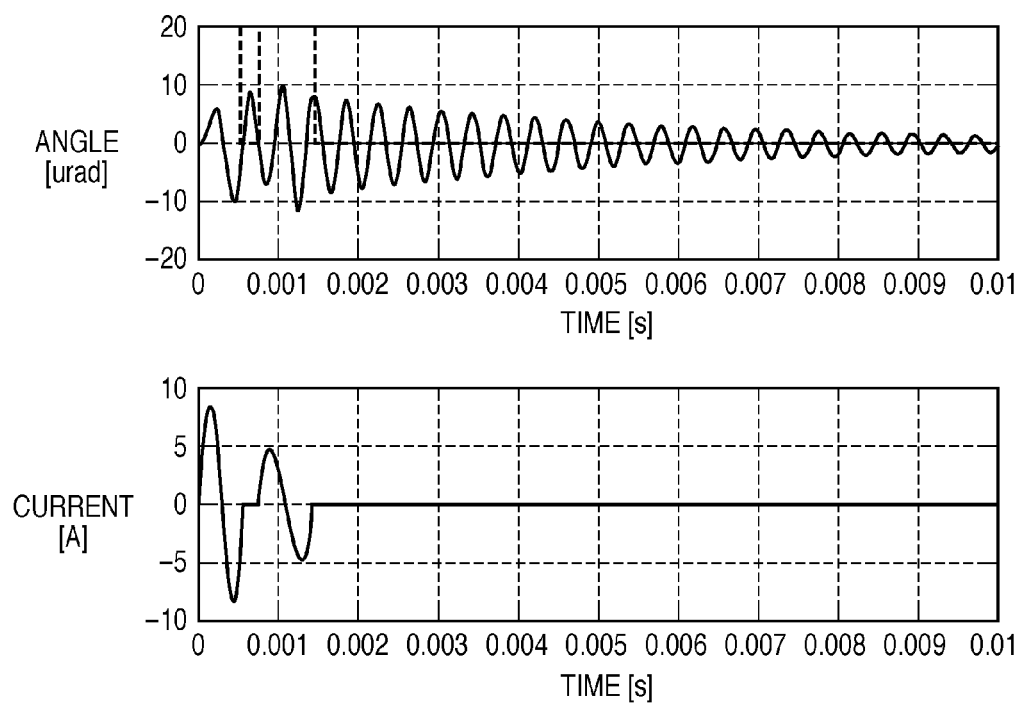
FIG. 9 is a view for explaining mirror positioning in the galvano apparatus according to the third embodiment.

After the mirror 11 was set in the final state with respect to a command for performing the first positioning (the supply of the electric current to the driver 142), 200 [μsec] were elapsed as a time required for laser light irradiation, and a command for performing the second positioning was issued. FIGS. 8A, 8B, and 9 show results when the face tangle error angle of the mirror 11 was estimated by setting the final step count to 79, 90, and 100 for the second positioning. In the upper half of each of FIGS. 8A, 8B, and 9, the face tangle error angle (an estimated value) of the mirror 11 is indicated by the solid line, and the rotational angle of the mirror 11 detected by a detector 13 is indicated by the broken lines. Also, the lower half of each of FIGS. 8A, 8B, and 9 shows the waveform of the electric current supplied from the driver 142 to the motor 12.

As in the second embodiment, assume that in order to satisfy the processing accuracy of an object, the difference between the rotational angle and target angle of the mirror and the face tangle error angle of the mirror must be 10 [μrad] or less.

As shown in FIG. 8A, when the final step count in the second positioning is 79, the face tangle error angle of the mirror is 10 [μrad] or more when the second positioning is complete. FIG. 8A shows that 3.2 [msec] are necessary before the face tangle error angle of the mirror becomes 10 [μrad] or less. Also, as shown in FIG. 8B, when the final step count in the second positioning is 90, 2.2 [msec] are necessary before the face tangle error angle of the mirror becomes 10 [μrad] or less since the second positioning is complete.

On the other hand, as shown in FIG. 9, when the final step count in the second positioning is 105, the face tangle error angle of the mirror is 10 [μrad] or less when the second positioning is complete, and the laser light irradiation conditions are met 1.4 [msec] after that.

In this embodiment as described above, the motor is controlled by adjusting the time for positioning the mirror of the galvano apparatus to the next target angle within the range in which the face tangle error angle of the mirror does not exceed the tolerance. This makes it possible to control the face tangle error angle (or vibration) of the mirror, and rapidly and accurately process an object as a processing target.

In this embodiment, the case in which the mirror is positioned twice in succession by the same rotational amount (angular moving amount) is explained. However, even when the mirror is positioned by different rotational amounts or positioned three times or more in succession, it is similarly possible to rapidly and accurately process an object as a processing target by adjusting the positioning time for rotating the mirror to the next target angle.

Fourth Embodiment

Figure 10:
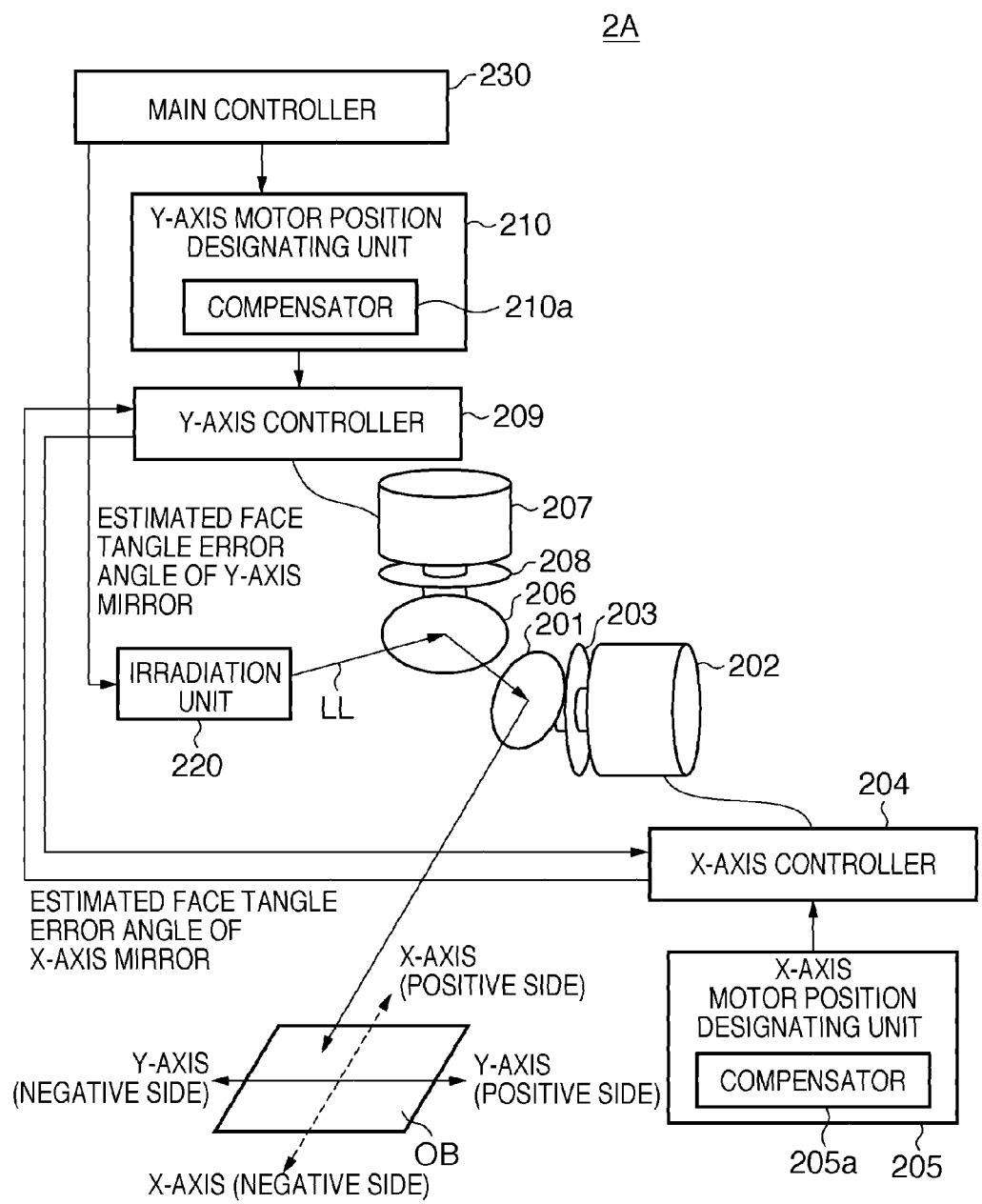
FIG. 10 is a schematic view showing the arrangement of a laser processing apparatus according to the fourth embodiment.

FIG. 10 is a schematic view showing the arrangement of a laser processing apparatus 2A according to the fourth embodiment of the present invention. The laser processing apparatus 2A includes an irradiation unit 220 for emitting laser light LL that irradiates an object OB as a processing target, a first unit for controlling the irradiation position of the laser light LL in the X-axis direction, a second unit for controlling the irradiation position of the laser light LL in the Y-axis direction, and a main controller 230. Note that the X- and Y-axes are perpendicular to each other.

The first unit includes an X-axis mirror (first mirror) 201, an X-axis motor (first motor) 202 for rotating the X-axis mirror 201, and an X-axis detector (first detector) 203 for detecting the rotational angle of the X-axis mirror 201. In addition, the first unit includes an X-axis controller 204 for controlling the X-axis motor 202, and an X-axis motor position designating unit 205 for controlling the irradiation position of the laser light LL in the X-axis direction by designating (inputting) the target angle of the X-axis mirror 201.

The second unit includes a Y-axis mirror (second mirror) 206, a Y-axis motor (second motor) 207 for rotating the Y-axis mirror 206, and a Y-axis detector (second detector) 208 for detecting the rotational angle of the Y-axis mirror 206. In addition, the second unit includes a Y-axis controller 209 for controlling the Y-axis motor 207, and a Y-axis motor position designating unit 210 for controlling the irradiation position of the laser light LL in the Y-axis direction by designating (inputting) the target angle of the Y-axis mirror 206.

The X-axis controller 204 and Y-axis controller 209 each have an arrangement equivalent to that of the controller 14 explained with reference to FIG. 1, and respectively estimate the face tangle error angles of the X-axis mirror 201 and Y-axis mirror 206. The X-axis controller 204 provides the main controller 230 with an X-axis mirror estimated face tangle error angle indicating the estimated face tangle error angle of the X-axis mirror 201, and the Y-axis controller 209 provides the main controller 230 with a Y-axis mirror estimated face tangle error angle indicating the estimated face tangle error angle of the Y-axis mirror 206. Also, the rotating shafts of the X-axis motor 202 and Y-axis motor 207 are perpendicular to each other.

When processing the object OB (that is, when irradiating the object OB with the laser light LL), the main controller 230 designates the coordinates of the irradiation position of the laser light LL on the object OB, to the X-axis motor position designating unit 205 and Y-axis motor position designating unit 210. The X-axis motor position designating unit 205 and Y-axis motor position designating unit 210 respectively convert the coordinates designated by the main controller 230 into the target angles of the X-axis mirror 201 and Y-axis mirror 206, and designate these target angles to the X-axis controller 204 and Y-axis controller 209. A compensator 205a of the X-axis motor position designating unit 205 corrects the target angle of the X-axis mirror 201 to be designated to the X-axis controller 204, so as to compensate for the positional deviation of the laser light LL in the X-axis direction, which is caused by the face tangle error angle of the Y-axis mirror 206 estimated by the Y-axis controller 209. Likewise, a compensator 210a of the Y-axis motor position designating unit 210 corrects the target angle of the Y-axis mirror 206 to be designated to the Y-axis controller 209, so as to compensate for the positional deviation of the laser light LL in the Y-axis direction, which is caused by the face tangle error angle of the X-axis mirror 201 estimated by the X-axis controller 204.

In this embodiment as described above, the face tangle error angle of the X-axis mirror 201 is compensated for by rotating the Y-axis mirror 206 by the Y-axis motor 207, and the face tangle error angle of the Y-axis mirror 206 is compensated for by rotating the X-axis mirror 201 by the X-axis motor 202. Accordingly, the laser processing apparatus 2A can reduce processing errors of the object OB, and accurately process the object OB.

Figure 11:
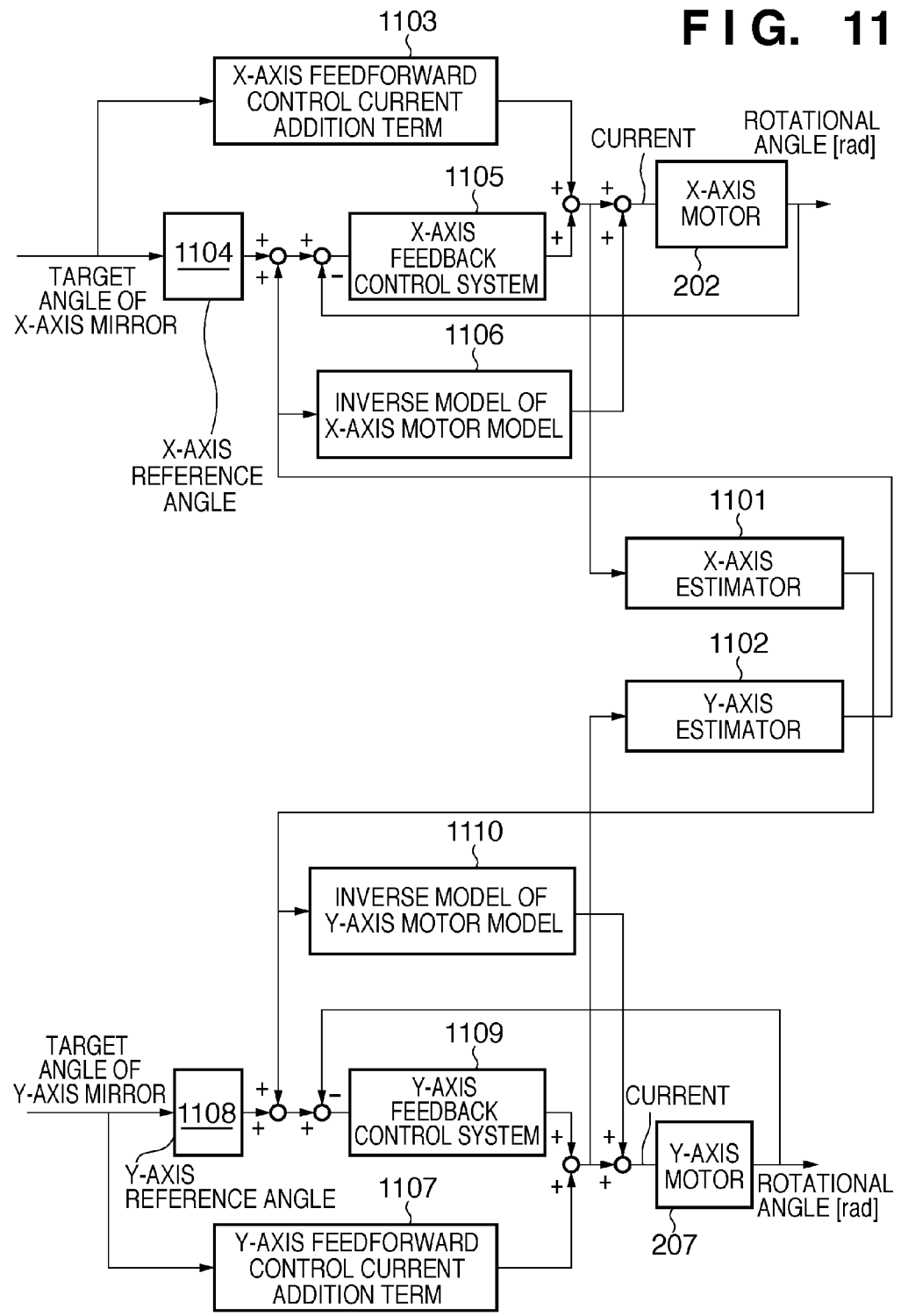
FIG. 11 is a schematic block diagram showing an example of the arrangement of a mirror positioning control system in the laser processing apparatus shown in FIG. 10.

FIG. 11 is a schematic block diagram showing an example of the arrangement of a positioning control system of the X-axis mirror 201 and Y-axis mirror 206 of the laser processing apparatus 2A. In this embodiment, the X-axis motor 202 has a motor model by which the rotational angle of the X-axis mirror 201 detected by the X-axis detector 203 is approximated by a transfer function model of $1.736 \times 10^4/\mathrm{s}^2$ with respect to the value of an electric current supplied from a driver. Analogously, the Y-axis motor 207 has a motor model by which the rotational angle of the Y-axis mirror 206 detected by the Y-axis detector 208 is approximated by a transfer function model of $1.736 \times 10^4/\mathrm{s}^2$ with respect to the value of an electric current supplied from a driver. Also, the X-axis mirror 201, Y-axis mirror 206, X-axis detector 203, and Y-axis detector 208 are rigid parts that do not twist against motions in the rotational directions.

As shown in FIG. 11, the positioning control system of the X-axis mirror 201 and Y-axis mirror 206 according to this embodiment is constructed by a two-degrees-of-freedom digital control system. Note that an X-axis estimator 1101 and Y-axis estimator 1102 respectively estimate the face tangle error angles of the X-axis mirror 201 and Y-axis mirror 206 by using the model indicated by equation (1).

Positioning control of the X-axis mirror 201 will be explained below. An X-axis feedforward control current addition term 1103 in the two-degrees-of-freedom control system is designed by a jerk minimization track based on final-state control. An X-axis reference angle 1104 is set to a value obtained by calculating an angular response by inputting the X-axis feedforward control current addition term 1103 to the motor model of the X-axis motor 202. An X-axis feedback control system 1105 receives a value calculated by subtracting the rotational angle of the X-axis mirror 201 from a value calculated by adding the face tangle error angle of the Y-axis mirror 206 estimated by the Y-axis estimator 1102 to the X-axis reference angle 1104. The X-axis estimator 1101 receives a current value obtained by the addition of the output from the X-axis feedforward control current addition term 1103 and the output from the X-axis feedback control system 1105, and estimates the inclination angle of the X-axis mirror 201. Also, the face tangle error angle of the Y-axis mirror 206 estimated by the Y-axis estimator 1102 is input to an inverse model 1106 of the X-axis motor model, and the value of an electric current to be supplied to the X-axis motor 202 in order to compensate for the face tangle error angle of the Y-axis mirror 206 is calculated. A current value obtained by adding the current value output from the inverse model 1106 of the X-axis motor model to a current value obtained by the addition of the output from the X-axis feedforward control current addition term 1103 and the output from the X-axis feedback control system 1105 is supplied to the X-axis motor 202. Accordingly, the X-axis feedback control system 1105 does not function when the rotational angle obtained from the motor model of the X-axis motor 202 matches the actual rotational angle of the X-axis motor 202 (that is, the rotational angle of the X-axis mirror 201 detected by the X-axis detector 203). Assume that in this embodiment, the rotational angle obtained from the motor model of the X-axis motor 202 matches the actual rotational angle of the X-axis motor 202.

Positioning control of the Y-axis mirror 206 will be explained below. A Y-axis feedforward control current addition term 1107 in the two-degrees-of-freedom control system is designed by a jerk minimization track based on final-state control. A Y-axis reference angle 1108 is set to a value obtained by calculating an angular response by inputting the Y-axis feedforward control current addition term 1107 to the motor model of the Y-axis motor 207. A Y-axis feedback control system 1109 receives a value calculated by subtracting the rotational angle of the Y-axis mirror 206 from a value calculated by adding the face tangle error angle of the X-axis mirror 201 estimated by the X-axis estimator 1101 to the Y-axis reference angle 1108. The Y-axis estimator 1102 receives a current value obtained by the addition of the output from the Y-axis feedforward control current addition term 1107 and the output from the Y-axis feedback control system 1109, and estimates the inclination angle of the Y-axis mirror 206. Also, the face tangle error angle of the X-axis mirror 201 estimated by the X-axis estimator 1101 is input to an inverse model 1110 of the Y-axis motor model, and the value of an electric current to be supplied to the Y-axis motor 207 in order to compensate for the face tangle error angle of the X-axis mirror 201 is calculated. A current value obtained by adding the current value output from the inverse model 1110 of the Y-axis motor model to a current value obtained by the addition of the output from the Y-axis feedforward control current addition term 1107 and the output from the Y-axis feedback control system 1109 is supplied to the Y-axis motor 207. Accordingly, the Y-axis feedback control system 1109 does not function when the rotational angle obtained from the motor model of the Y-axis motor 207 matches the actual rotational angle of the Y-axis motor 207 (that is, the rotational angle of the Y-axis mirror 206 detected by the Y-axis detector 208). Assume that in this embodiment, the rotational angle obtained from the motor model of the Y-axis motor 207 matches the actual rotational angle of the Y-axis motor 207.

As described above, the face tangle error angles of the X-axis mirror 201 and Y-axis mirror 206 can be approximated by the transfer function model of a single-degree-of-freedom damping system of $(1.061 \times 10^2)/(s^2+427.3s+2.547 \times 10^8)$. Also, the responses of the rotational angles of the X-axis mirror 201 and Y-axis mirror 206 respectively detected by the X-axis detector 203 and Y-axis detector 208 with respect to the values of the electric currents supplied from the drivers are obtained by a transfer function of $1.736 \times 10^4/s^2$. Accordingly, the response of the Y-axis motor 207 required to correct the face tangle error angle of the X-axis mirror 201 is $\{(1.061 \times 10^2)/(s^2+427.3s+2.547 \times 10^8)\}/(1.736 \times 10^4/s^2)$.

In this embodiment, a case in which the X-axis mirror 201 is positioned once by a rotational amount (rotational moving amount) of $7 \times 10^{-3}$ [rad] when positioning the laser light irradiation position in only the X-axis direction will be explained in detail. Note that the face tangle error angle of the X-axis mirror 201 is compensated for by rotating the Y-axis mirror 206 by the Y-axis motor 207, and the face tangle error angle of the Y-axis mirror 207 is not compensated for.

Assume that the angular position of the X-axis mirror 201 in the initial state is x [0]=0 [rad], the angular position in the final state is x [N]=$7 \times 10^{-3}$ [rad], the sampling frequency is 150 kHz, and the final step count is 79.

Figure 12A:
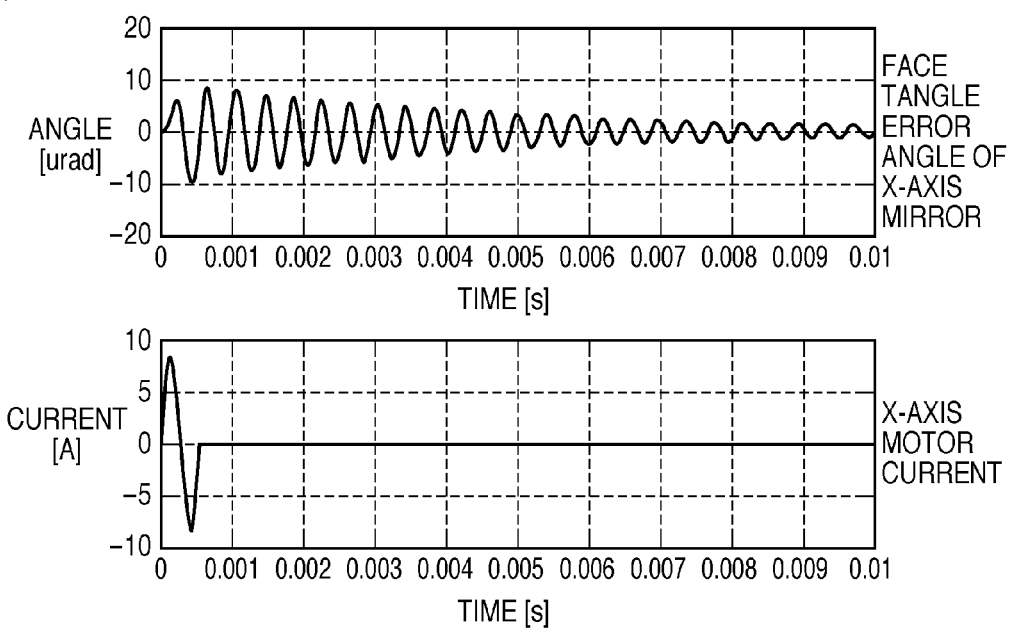
FIGS. 12A and 12B are views for explaining mirror positioning in a galvano apparatus according to the fourth embodiment.

The upper half of FIG. 12A shows the face tangle error angle of the X-axis mirror 201, and the lower half of FIG. 12A shows the waveform of an electric current supplied to the X-axis motor 202. Also, the upper half of FIG. 12B shows the rotational angle of the Y-axis mirror 206 necessary to compensate for the face tangle error angle of the X-axis mirror 201 shown in the upper half of FIG. 12A, and the lower half of FIG. 12B shows the waveform of an electric current supplied to the Y-axis mirror 207.

Figure 12B:
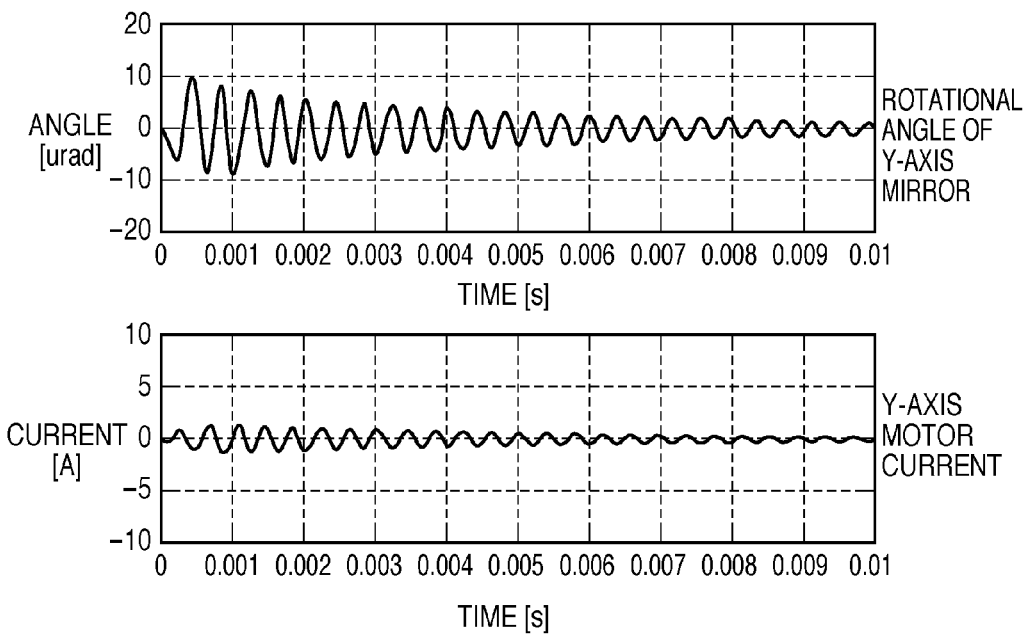

Comparing FIG. 12A with FIG. 12B indicates that the face tangle error angle of the X-axis mirror 201 and the rotational angle of the Y-axis mirror 206 have a phase difference of 180°, so the face tangle error angle of the X-axis mirror 201 can be corrected by rotating the Y-axis mirror 206. Similarly, the face tangle error angle of the Y-axis mirror 206 can be corrected by rotating the X-axis mirror 201. Note that when correcting the face tangle error angle of the X-axis mirror 201 by rotating the Y-axis mirror 206, the Y-axis mirror 206 produces a face tangle error angle, but this face tangle error angle is very small and negligible. It is, of course, also possible to correct the face tangle error angle of the Y-axis mirror 206 again by rotating the X-axis mirror 201.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2010-128269 filed on Jun. 3, 2010, which is hereby incorporated by reference herein in its entirety.

What is claimed is:

1. An apparatus for angular positioning of a mirror, the apparatus comprising:
    a mirror;
    a motor, including a rotatable shaft, configured to rotate the mirror via the rotatable shaft;
    a detector configured to detect a rotational angle of the mirror around a designed central axis of the rotatable shaft; and
    a controller configured to:
        supply electric current to the motor based on an output of the detector so that the rotational angle of the mirror reaches a target angle;
        estimate, based on a model representing a relation between a value of electric current to be supplied to the motor and an angle of inclination of the mirror, the angle of inclination of the mirror in a case where the electric current is supplied to the motor, wherein the angle of inclination of the mirror is an angle at which the mirror inclines with respect to the designed central axis; and
        if the estimated angle of inclination exceeds a predetermined tolerance, adjust supply of electric current to the motor so that the angle of inclination of the mirror falls within the predetermined tolerance.

2. The apparatus according to claim 1, wherein the controller is configured to set a waiting time required before the mirror is rotated to a next target angle.

3. The apparatus according to claim 1, wherein the controller is configured to adjust a time required to rotate the mirror to a next target angle.

4. An apparatus for angular positioning of a mirror, the apparatus comprising:
    a first mirror;
    a first motor, including a first rotatable shaft, configured to rotate the first mirror via the first rotatable shaft;
    a first detector configured to detect a first rotational angle of the first mirror around a first designed central axis of the first rotatable shaft; and
    a first controller configured to:
        supply electric current to the first motor based on an output of the first detector so that the first rotational angle of the first mirror reaches a target angle; and
        estimate, based on a model representing a relationship between a value of electric current to be supplied to the first motor and a first angle of inclination of the first mirror, the first angle of inclination of the first mirror in a case where electric current is supplied to the first motor, wherein the first angle of inclination of the first mirror is an angle at which the first mirror inclines with respect to the first designed central;
a second mirror;
a second motor, including a second rotatable shaft perpendicular to the first rotatable shaft, configured to rotate the second mirror via the second rotatable shaft;
a second detector configured to detect a second rotational angle of the second mirror around a second designed central axis of the second rotatable shaft; and
a second controller configured to:
supply electric current to the second motor based on an output of the second detector so that the second rotational angle of the second mirror reaches a target angle; and
estimate, based on a model representing a relation between a value of electric current to be supplied to the second motor and a second angle of inclination of the second mirror, the second angle of inclination of the second mirror in a case where electric current is supplied to the second motor, wherein the second angle of inclination of the second mirror is an angle at which the second mirror inclines with respect to the second designed central axis,
wherein the first controller is configured to control, based on the estimated second angle of inclination of the second mirror, the first rotational angle of the first mirror, and
wherein the second controller is configured to control, based on the estimated first angle of inclination of the first mirror, the second rotational angle of the second mirror.

5. A processing apparatus for irradiating an object with a light, the processing apparatus comprising:
an apparatus for angular positioning of a mirror; and
an irradiation unit,
wherein the apparatus for angular positioning of a mirror comprises:
a mirror;
a motor, including a rotatable shaft, configured to rotate the mirror via the rotatable shaft;
a detector configured to detect a rotational angle of the mirror around a designed central axis of the rotatable shaft; and
a controller configured to:
supply electric current to the motor based on an output of the detector so that the rotational angle of the mirror reaches a target angle;
estimate, based on a model representing a relation between a value of electric current to be supplied to the motor and an angle of inclination of the mirror, the angle of inclination of the mirror in a case where electric current is supplied to the motor, wherein the angle of inclination of the mirror is an angle at which the mirror inclines with respect to the designed central axis; and
if the estimated angle of inclination exceeds a predetermined tolerance, adjust supply of electric current to the motor so that the angle of inclination of the mirror falls within the predetermined tolerance, and
wherein the irradiation unit is configured to irradiate the mirror with the light.

6. A processing apparatus for irradiating an object with a light, the processing apparatus comprising:
a mirror;
an irradiation unit configured to irradiate the object with the light via the mirror;
a motor, including a rotatable shaft, configured to rotate the mirror via the rotatable shaft;
a detector configured to detect a rotational angle of the mirror around a designed central axis of the rotatable shaft; and
a controller configured to:
supply electric current to the motor based on an output of the detector so that the rotational angle of the mirror reaches a target angle;
estimate, based on a model representing a relation between a value of electric current to be supplied to the motor and an angle of inclination of the mirror, the angle of inclination of the mirror in a case where electric current is supplied to the motor, wherein the angle of inclination of the mirror is an angle at which the mirror inclines with respect to the designed central axis;
if the estimated angle of inclination exceeds a predetermined tolerance, cause the irradiation unit to wait for irradiating of the object with the light.

7. An apparatus for angular positioning of a mirror, the apparatus comprising:
a first mirror;
a first motor, including a first rotatable shaft, configured to rotate the first mirror via the first rotatable shaft;
a first detector configured to detect a first rotational angle of the first mirror around a first designed central axis of the first rotatable shaft; and
a first controller configured to:
supply electric current to the first motor based on an output of the first detector so that the first rotational angle of the first mirror reaches a target angle; and
estimate, based on a model representing a relationship between a value of electric current to be supplied to the first motor and an angle of inclination of the first mirror, the angle of inclination of the first mirror in a case where electric current is supplied to the first motor, wherein the first angle of inclination of the first mirror is an angle at which the first mirror inclines with respect to the first designed central axis;
a second mirror;
a second motor, including a second rotatable shaft perpendicular to the first rotatable shaft, configured to rotate the second mirror via the second rotatable shaft;
a second detector configured to detect a second rotational angle of the second mirror around a second designed central axis of the second rotatable shaft; and
a second controller configured to:
supply electric current to the second motor based on an output of the second detector so that the second rotational angle of the second mirror reaches a target angle; and
control, based on the estimated angle of inclination of the first mirror, the second rotational angle of the second mirror.

8. A processing apparatus for irradiating an object with a light, the processing apparatus comprising:
an apparatus for angular positioning of a mirror; and
an irradiation unit,
wherein the apparatus for angular positioning of a mirror comprises:
a first mirror;
a first motor, including a first rotatable shaft, configured to rotate the first mirror via the first rotatable shaft;

a first detector configured to detect a first rotational angle of the first mirror around a first designed central axis of the first rotatable shaft; and a first controller configured to:
supply electric current to the first motor based on an output of the first detector so that the first rotational angle of the first mirror reaches a target angle; and estimate, based on a model representing a relationship between a value of electric current to be supplied to the first motor and an angle of inclination of the first mirror, the angle of inclination of the first mirror in a case where electric current is supplied to the first motor, wherein the angle of inclination of the first mirror is an angle at which the first mirror inclines with respect to the first designed central axis;

a second mirror;

a second motor, including a second rotatable shaft perpendicular to the first rotatable shaft, configured to rotate the second mirror via the second rotatable shaft;

a second detector configured to detect a second rotational angle of the second mirror around a second designed central axis of the second rotating shaft; and a second controller configured to:
supply electric current to the second motor based on an output of the second detector so that the second rotational angle of the second mirror reaches a target angle; and control, based on the estimated angle of inclination of the first mirror, the second rotational angle of the second mirror, and wherein the irradiation unit is configured to irradiate the object with the light via the first and second mirrors.

* * * * *